(12) United States Patent
Luzzi et al.

(10) Patent No.: US 7,969,135 B2
(45) Date of Patent: Jun. 28, 2011

(54) REGULATION CIRCUIT AND A METHOD FOR REGULATING AN INPUT VOLTAGE

(75) Inventors: Raimondo Luzzi, Graz (AT); Marco Bucci, Graz (AT)

(73) Assignee: Infineon Technologies AG, Neubiberg (DE)

( * ) Notice: Subject to any disclaimer, the term of this patent is extended or adjusted under 35 U.S.C. 154(b) by 289 days.

(21) Appl. No.: 12/191,594

(22) Filed: Aug. 14, 2008

(65) Prior Publication Data
US 2010/0039089 A1 Feb. 18, 2010

(51) Int. Cl.
*G05F 5/00* (2006.01)
*H02M 1/36* (2007.01)
(52) U.S. Cl. ............ 323/299; 323/901; 340/10.34
(58) Field of Classification Search .......... 323/220, 323/222, 223, 299, 351, 901; 340/10.34
See application file for complete search history.

(56) References Cited

U.S. PATENT DOCUMENTS

| | | | | |
|---|---|---|---|---|
| 4,712,169 A | * | 12/1987 | Albach | 363/89 |
| 5,704,352 A | * | 1/1998 | Tremblay et al. | 600/300 |
| 5,945,817 A | * | 8/1999 | Nguyen | 323/273 |

FOREIGN PATENT DOCUMENTS

| | | |
|---|---|---|
| WO | WO-2006/003460 A1 | 1/2006 |
| WO | WO-2007/025289 A2 | 3/2007 |

* cited by examiner

*Primary Examiner* — Gary L Laxton
(74) *Attorney, Agent, or Firm* — Dickstein Shapiro LLP

(57) ABSTRACT

A regulation circuit comprises an error detector, an integrator, and a voltage regulator. The error detector comprises an input for an input voltage, a further input for a reference voltage and an output for an error signal, wherein the error signal depends on the input voltage and the reference voltage. The integrator comprises an input for the error signal and an output for an integrated error signal. The voltage regulator comprises an input for the input voltage and a terminal for the integrated error signal, wherein the voltage regulator is configured to adjust a shunt current responsive to the integrated error signal such that the input voltage is adjusted towards the target voltage.

17 Claims, 7 Drawing Sheets

REGULATION CIRCUIT AND A METHOD FOR REGULATING AN INPUT VOLTAGE

BACKGROUND OF THE INVENTION

The embodiments of the present invention relate to a voltage regulation circuit and a method for regulating an input voltage, for example, for a contact-less transponder.

BRIEF SUMMARY OF THE INVENTION

Embodiments of the present invention relate to a regulation circuit comprising an error detector, an integrator, and a voltage regulator. The error detector comprises an input for an input voltage, a further input for a reference voltage and an output for an error signal, wherein the error signal depends on the input voltage and the reference voltage. The integrator comprises an input for the error signal and an output for an integrated error signal. The voltage regulator comprises an input for the input voltage and a terminal for the integrated error signal, wherein the voltage regulator is configured to adjust a shunt current responsive to the integrated error signal such that the input voltage is adjusted towards the target voltage.

BRIEF DESCRIPTION OF SEVERAL VIEWS OF THE DRAWINGS

Features of embodiments of the invention will be more readily appreciated and better understood by reference to the following detailed description, which should be considered with reference to the accompanying drawings, in which:

FIG. 6 shows a circuit for the voltage regulator; and.

Figure 1:
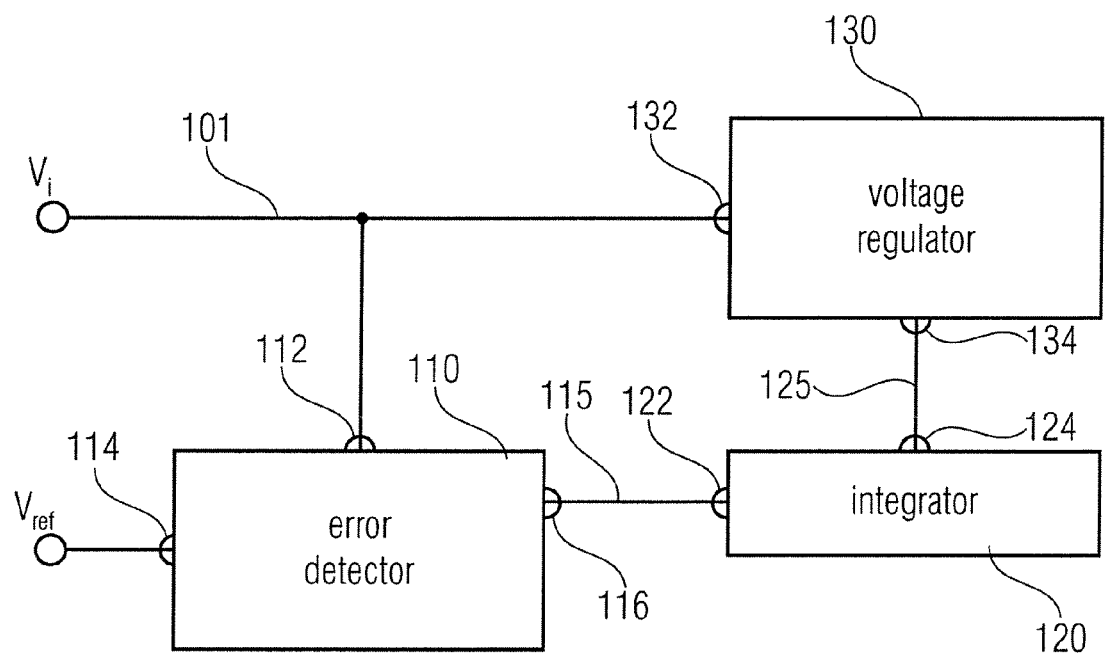
FIG. 1 shows a block diagram of a circuit according to embodiments of the present invention.

Before embodiments of the present invention are explained in more detail below with reference to the drawings, it is to be noted that equal elements or those operating in an equal manner are provided with the same or similar reference numerals in the Figures, and that a repeated description of these elements is omitted.

DETAILED DESCRIPTION OF THE INVENTION

A contact-less transponder is one example, in which an efficient voltage regulation is important. The amplitude of an induced signal in an antenna of the contact-less transponder may experience namely large variations as the distance and/or orientation of the transponder with respect to the reader changes. In order to protect the transponder from excessive voltage (e.g. overshoots) and to support the communication (modulation/demodulation), a regulation of the input (antenna) voltage is therefore needed.

In conventional circuits for providing a voltage regulation an envelope detector follows the antenna voltage amplitude with a certain time constant (delay). In this conventional regulation loop the output of the envelope detector is compared with a reference voltage $V_{ref}$ and the error signal is fed back to a shunting device comprising, for example, a variable current source ($I_{shunt}$), which in turn changes the input voltage. In addition, at startup, a second inaccurate reference potential is generated ($V_{ref\_startup}$) and both, a pull-down current ($I_{pd}$) and an error amplifier bias current are increased in order to make the regulation loop faster. The purpose of this startup-mode is to ensure that no excessive voltage can occur at startup and that the operational voltage is well below a target voltage or within a target voltage region. After this startup-mode (fast mode) the system switches to the normal mode, which typically implies an increase in the input voltage. During communication the system may change into a hold-mode by disabling the regulation loop.

This conventional solution shows, however, the following disadvantages:

- A switching from fast-mode to normal-mode and back causes overshoots in the input voltage $V_i(t)$, since the error amplifier bias point is changed.
- A switching from normal-mode to hold-mode and back during communication causes overshoots as well, since the error amplifier is disconnected from the shunting device.
- Employing a variable current source as shunting device causes an amplification of the transmitted modulation depths thus distorting the field, so that an additional circuitry may be needed to suppress this effect during reception (e.g. by a coupling capacitance $C_c$).

Therefore, there is a need to provide a regulation circuit, which avoids the overshoots in the input voltage while changing modes of operation (e.g. startup-mode, normal-mode, and hold-mode).

Embodiments of the present invention provide such a regulation circuit, which comprises an error detector, an integrator and a voltage regulator. The error detector comprises an input for the input voltage $V_i$, a further input for a reference voltage $V_{ref}$ and an output for an error signal $Q_e$, wherein the error signal measures a deviation of the input voltage from the target voltage. The integrator comprises an input for the error signal and an output for an integrated error signal. The voltage regulator comprises an input for the input voltage an input for the integrated errors signal. The voltage regulator is configured to adjust a shunt current responsive to the integrated error signal, such that the input voltage changes towards a target voltage. The target voltage can, for example, be chosen, such that a micro-controller on a transponder is sufficiently protected, for example by keeping the input voltage below a certain threshold value.

The input voltage can, for example, be amplitude modulated, so that the input voltage reads:

$$V_i(t) = A_i(t) \cdot \sin(\omega_c t).$$

According to embodiments the input voltage is controlled by means of a variable resistor $R_{shunt}$ whose control voltage $V_c$ is set by the integrator (the integrated error signal) according to the error signal $Q_e$ provided by the error detector.

Hence, the input voltage comprises subsequent periods, in which the peak voltage can change. During the i-th semi-period, the error detector outputs an amount of charge proportional to the difference between K times the reference voltage $V_{ref}$ and the peak voltage of the (i−2)-th semi-period $V_p[i-2]$:

$$Q_e[i] = G_d(K \cdot V_{ref} - V_p[i-2])$$

where $G_d$ is the error detector gain and K is a constant factor contributing to the adjustment of the target voltage.

Embodiments for the integrator comprise, for example, an integrator capacitor $C_{INT}$, which collects the charges $Q_e$ of the error detector and, therefore, the control voltage during the i-th semi-period is given by:

$$V_c[i]=V_c[i-1]+Q_e[i]/C_{INT}$$

where $C_{INT}$ is the integrator capacitor and $V_c[i-1]$ is the control voltage (integrated error signal) applied during the previous semi-period.

According to embodiments the control voltage is input in the voltage regulator, which controls the shunt current such that during the i-th semi-period the shunt current becomes:

$$I_{shunt}(t)=G_m(V_c[i])\cdot V_i(t)$$

where $G_m$ comprises the shunt transconductance.

An advantage of using an integrator in embodiments is that the output is kept constant if the error signal vanishes ($Q_e[i]=0$). Therefore, in a steady state, the amplitude of the input voltage $V_i(t)$ is regulated to $K*V_{ref}$.

In further embodiments at startup, an additional (fast but inaccurate) regulation loop forces the control voltage $V_c$ to a startup voltage ($V_{startup}$), which guarantees an input voltage $V_i(t)$ high enough (above a threshold) to supply a microcontroller. At the same time, there is not yet a precise reference available and hence the integrator capacitance $C_{INT}$ is loaded to the startup voltage $V_{startup}$ by disconnecting the error detector and closing $C_{INT}$ to ground. During this phase the integrator may be disabled. After power-up (e.g. related to the signal POR=0, POR=power on reset), the startup voltage $V_{startup}$ goes in high impedance, the integrator is enabled and the error detector is re-connected (e.g. related to a startup signal: startup=0) so that the regulation loop is active. Since in this embodiment the integrator capacitor $C_{INT}$ was already pre-charged to the startup voltage $V_{startup}$, switching from startup to the regulation loop does not cause overshoots on the input voltage $V_i$. Therewith the afore-mentioned disadvantages of a conventional regulation circuits are avoided.

In particular, during a load modulation of the transponder, the regulation loop goes in the hold-mode on the first modulation edge and may remain in this state for the whole communication that means as long as the modulator is enabled. In the demodulation mode, the regulation loop goes in hold-mode as soon as the demodulator detects the first falling edge in the antenna voltage (input voltage) $V_i$ and stays in this state for the whole communication as well.

Therefore, embodiments provide an antenna voltage regulation circuit keeping the input voltage of the microcontroller within a working range–above minimal value at startup and below a maximal value (target voltage) during normal operation (e.g. no overshoots during mode changes).

Since the integrator is referred to ground, the leakage through the input switches is minimized and a voltage drop across the switch is close to zero.

In addition, since the shunt device or shunt element comprises a variable resistor, the shunt current is proportional to the input voltage (i.e. $I_{shunt} \propto V_i(t)$) and hence a certain modulation depth from the reader corresponds to the same modulation on the antenna voltage and the field is not distorted. This is important in case of multiple transponders in the field.

In summary, embodiments of the present invention describe a regulation loop for the antenna voltage in a contactless transponder, which may be based on a precise, discrete-time, error detector and an integrating circuit. Switching from regulation-mode to hold-mode during the communication does not cause any overshoot on the antenna voltage and hence overcomes the afore-mentioned disadvantages of conventional circuits.

Embodiments of the present invention comprise, moreover, a circuit for the error detector and a circuit for the voltage regulator, which will be described in more detail below.

FIG. 1 shows a block diagram for a circuitry according to embodiments of the present invention comprising an error detector 110, an integrator 120 and a voltage regulator 130. The error detector 110 comprises an input 112 for the input voltage $V_i$ and a further input 114 for a reference voltage $V_{ref}$. The error detector 110 comprises, moreover, an output 116 for an error signal 115, which is sent to an input 122 of the integrator 120. The integrator 120 comprises an output 124 for an integrated error signal 125. The voltage regulator 130 comprises a terminal 134 for the integrated error signal 125 and a terminal 132 for the input voltage $V_i$ and the voltage regulator is configured to the change the input voltage in response to the integrated error signal 125 at the terminal 134. Changing a shunt current accordingly can for example, perform the regulation.

In FIG. 1 the input voltage $V_i$ is applied to the line 101, which is connected to the terminal 132 of the voltage regulator 130 and to the input 112 of the error detector 110. In general the line 101 comprises two lines between which the input voltage is formed and which are connected to the antenna.

Figure 2:
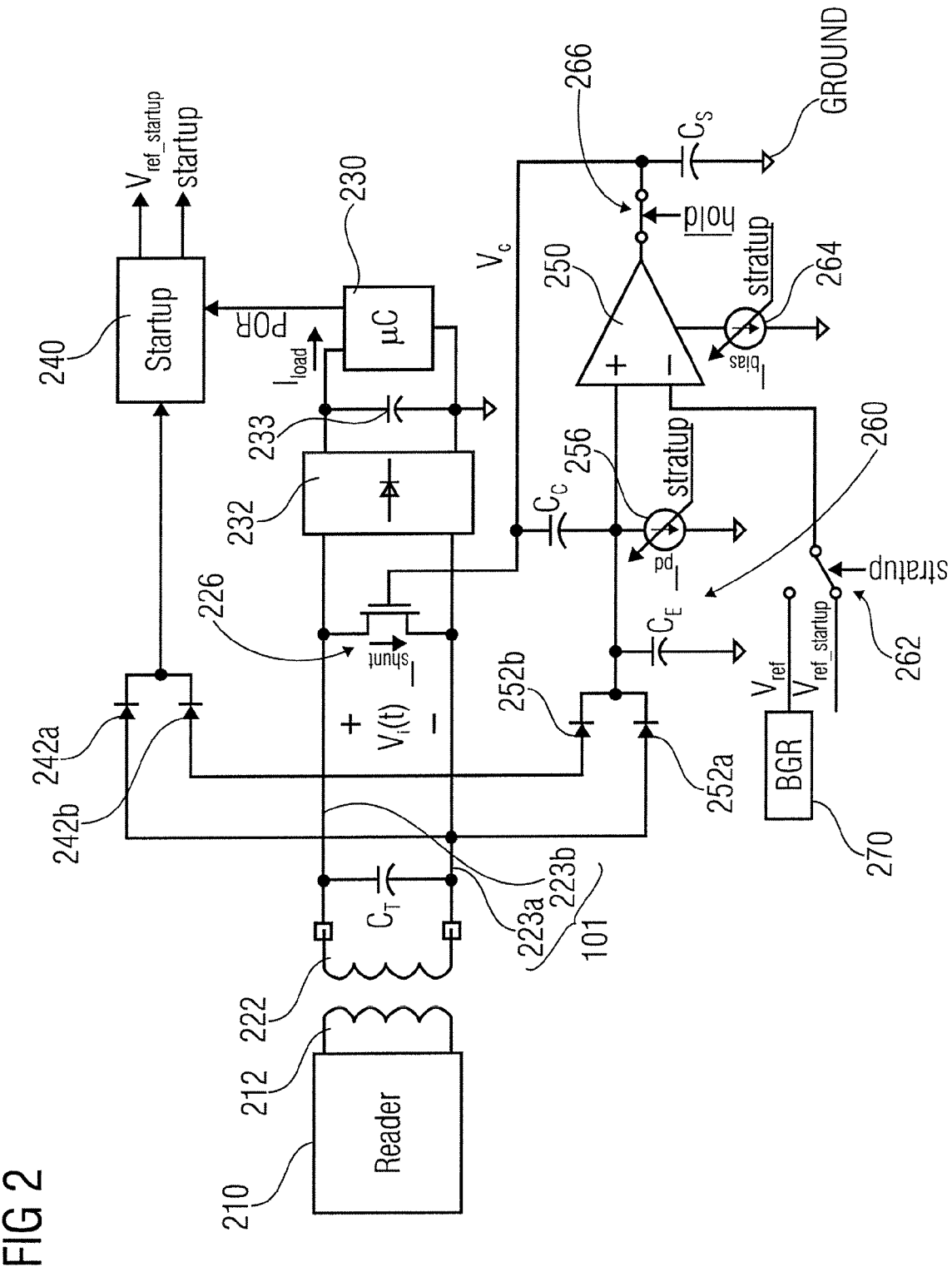
FIG. 2 shows a conventional circuitry for voltage regulation.

FIG. 2 shows a conventional circuit for regulating a voltage $V_i$ of an antenna 222 of a transponder. The antenna 222 is electromagnetically coupled to a reader 210, comprising a further antenna 212. In the transponder antenna 222 the input voltage $V_i$ for a microcontroller 230 is induced, so that a load current $I_{load}$ enters the microcontroller 230 after the input voltage $V_i$ is rectified in a rectifier 232. A rectifier capacitor 233 is connected in parallel to the microcontroller 230. Therefore, the microcontroller 230 is via the rectifier 232 connected with the transponder antenna 222 by a first line 223a and a second line 223b. The first and second line 223a,b are connected by a capacitor $C_T$ and a shunt transistor 226, which comprise a MOSFET, for example. The microcontroller 230 is connected to a startup module 240 to transmit a POR-signal. The startup module 240 comprises, in addition, an input for a rectified input voltage $V_i$, which is obtained from a first diode 242a connected between the first line 223a and the input of the startup module 240. In addition, a second diode 242b is connected between the second line 223b and the input of the startup module 240. The startup module 240 comprises, moreover, an output for the startup signal and an output for the startup reference potential $V_{ref\_startup}$.

The circuit of FIG. 2 comprises, moreover, an envelope detector 260 comprising a further capacitor $C_E$ and a current source 256 for the pull-down current $I_{pd}$. In addition, the circuit comprises an error amplifier 250 with a plus-input and a minus-input and an output connected to a gate of the shunt transistor 226. The capacitor $C_E$ is connected between the plus-input of the error amplifier 250 and a ground potential (GROUND) and the current source 256 is also connected between the plus-input of the error amplifier 250 and the ground potential. A further first diode 252a connects the first line 223a with the plus-input of the error amplifier 250 and a further second diode 252b connects the second line 223b with the plus-input of the error amplifier 250 so that the plus-input receives a rectified input potential. The minus-input of the error amplifier 250 is connected to a switch 262, which switches the minus-input either to the startup reference potential $V_{ref\_startup}$ at startup time or to the reference potential $V_{ref}$ otherwise. The reference potential $V_{ref}$ is formed, for example, by a bandgap reference 270 (BGR). The startup reference potential $V_{ref\_startup}$ is generated by the startup module 240. The error amplifier 250 is controlled (enabled or disabled) by a further current source 264, which provides a bias current $I_{bias}$ at the startup signal. Between the output of the error amplifier 250 and the gate of the shunt transistor 226 a hold switch 266 is arranged, such that in the hold-state the hold switch 266 is opened and otherwise closed. Between the output of the error amplifier 250 and the ground potential a shunt capacitor $C_s$ is arranged. Finally, a coupling capacitor $C_c$ is formed between the plus-input of the error amplifier 250 and the gate of the shunt transistor 226.

In operation, the error amplifier 250 compares the rectified input potential $V_i$ with a reference potential $V_{ref}$ (or at startup with a startup reference potential $V_{ref\_startup}$) and generates an output signal proportional to the deviation of the rectified input potential and the reference potential $V_{ref}$. This output will control the shunt transistor 226 via the gate contact. Therefore, the output of the error amplifier 250 comprises the control voltage $V_c$, which is generated from the error amplifier 250 (e.g. an operational amplifier) based on the difference between the rectified input voltage $V_i$ and the reference potential $V_{ref}$.

Figure 3:
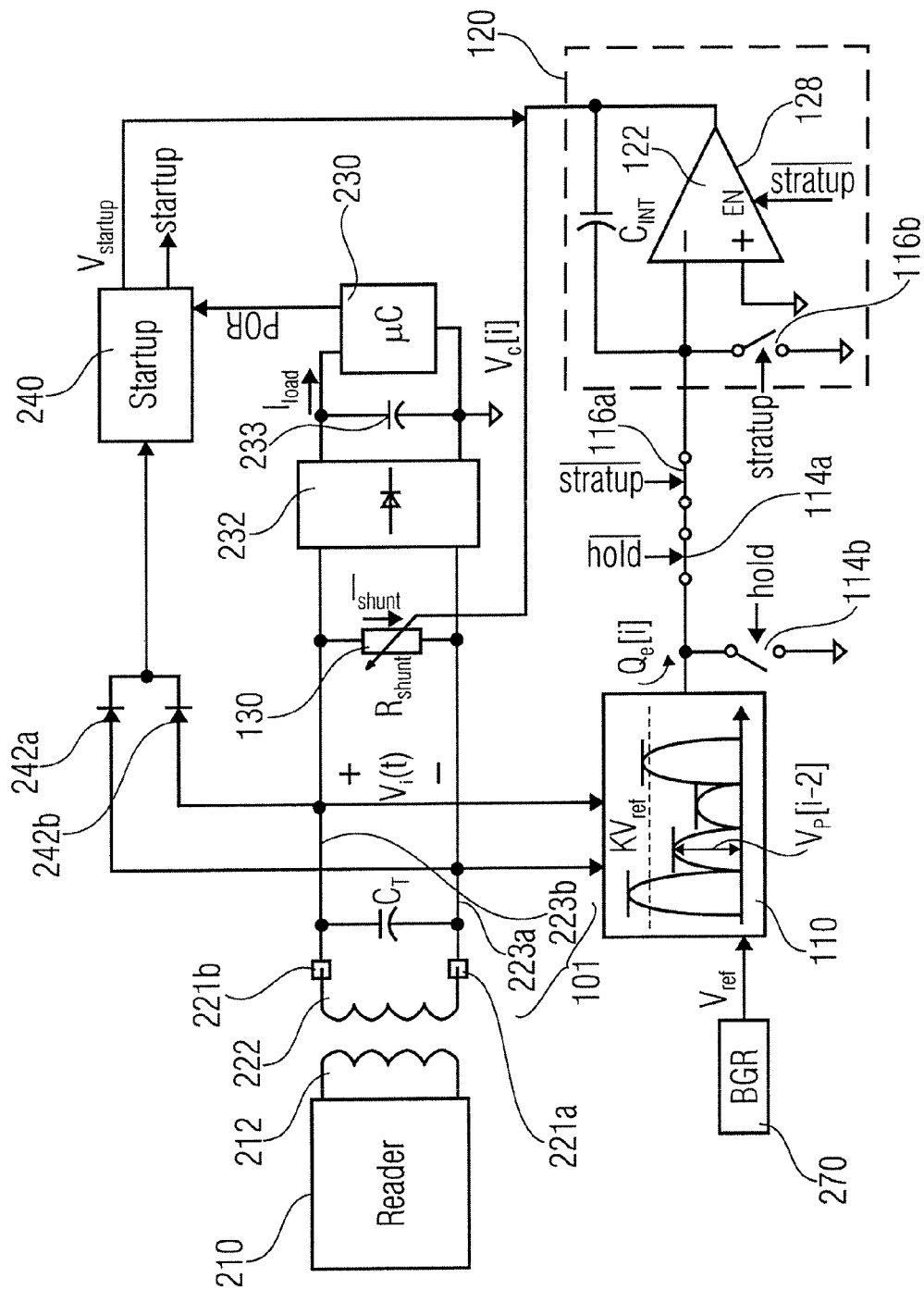
FIG. 3 shows a voltage regulation circuit for a transponder according to embodiments.

FIG. 3 shows a circuit for an input voltage regulation according to embodiments of the present invention comprising, for example, a transponder with a transponder antenna 222 and a microcontroller 230. The transponder may couple electromagnetically to a reader 210 with an antenna 212. The transponder antenna 222 can, for example, be connected via a first connector 221a to a first line 223a and via a second connector 221b to a second line 223b. The first and second line 223a,b provide the input voltage $V_i(t)$ (induced by the reader, for example) to the microcontroller 230. Therefore, when the transponder is coupled to the reader 210 a load current $I_{load}$ is input into the microcontroller 230 after the input voltage $V_i$ is rectified in the rectifier 232. The rectifier capacitor 233 is again connected in parallel to the microcontroller 230. The first and second line 223a and 223b form the line 101 of FIG. 1 and are connected by a capacitance $C_T$ and, in addition, by a variable shunt resistor 130 (voltage regulator).

The embodiment as shown in FIG. 3 comprises, moreover, the error detector 110, the integrator 120 and a startup module 240. The error detector 110 is connected to the first line 223a and to the second line 223b. In addition, the error detector 110 is connected to a source 270 (e.g. a band gap reference), which provides the reference voltage $V_{ref}$ for the error detector 110. An inverse hold switch 114a and an inverse startup switch 116a are connected in series between the error detector 110 and the integrator 120. The inverse hold switch 114a is closed, when the hold-signal is not present (hold=false) and the inverse startup switch 116a is closed, when the startup-signal is not present (startup=false). In addition, the output of the error detector 110 is connected to ground by a hold switch 114b, which is closed when the hold-signal is present. The integrator 120 comprises, for example, an operational amplifier 122 with a minus-input and a plus-input and an output. The operational amplifier 122 is enabled when the startup-signal is false (so that in the startup-mode the operational amplifier 122 is disabled). The integrator 120 comprises, moreover, a capacitor $C_{INT}$, which is connected between the minus-input and the output of the operational amplifier 122. The plus-input of the operational amplifier 122 is connected to ground. Between the minus-input of the operational amplifier 122 and ground is, moreover, a startup-switch 116b arranged, so that at a startup also the minus-input is connected to ground—otherwise it is disconnected from ground. The output of the integrator 120 is connected to the variable shunt resistor 130, so that the output signal of the integrator 120 controls the resistance of the variable shunt resistor 130. Therefore, the output of the integrator 120 provides the control voltage $V_c(i)$ for controlling the input voltage $V_i$ by adjusting the resistance and therewith the shunt current $I_{shunt}$ through the variable shunt resistor 130.

The startup-module 240 comprises an input connected to a node for the rectified input voltage $V_i$ and an input for the POR-signal (=trigger signal), which triggers the end of the startup-mode. Usually, POR=0 at the beginning and, as soon as the microcontroller 230 detects a valid power supply, POR is released (POR=1) and the startup mode is exited. The node for the rectified input potential is connected, for example, via a first diode 242a with the first line 223a and is connected via a second diode 242b with the second line 223b. The startup module 240 generates, in addition, the startup signal, which enables or disables the startup switches 116 and, in addition, the startup module 240 generates a startup voltage $V_{startup}$, which depends on the input potential $V_i$ and is applied to the control input of the variable shunt resistor 130, by forcing the output of the integrator which, accordingly to the startup signal is disabled. Therefore, the startup module comprises two outputs, one for the startup voltage and one for the startup signal.

Therefore, at a startup of the transponder, the startup module 240 generates the startup signal and the startup voltage $V_{startup}$ changes the resistance of the variable shunt resistor 130, for example, to a lower value, so that the input voltage can be lower than in the operational mode. The startup module 240 is triggered by the microcontroller 230, which provides the POR-signal, which triggers the end of the startup-mode. After the startup-mode, which may extend for a predetermined time period depending, for example, on the transponder, the system switches into the normal operation mode, so that the startup signal becomes false (for example startup=0). In this normal operation mode the error detector 110 is connected to the integrator 120 and at the same time the operational amplifier 122 is enabled, so that the integrator 120 starts integrating the error signal $Q_e$ provided from the error detector 110. As consequence, the voltage applied to the variable resistor 130 changes from the startup voltage $V_{startup}$ to the control voltage $V_c(i)$, wherein the argument "i" corresponds to the i-th contribution provided from the error detector 110 in the i-th step. Note, the input voltage $V_i$ is alternating so that a rectified input voltage comprises a sequence of peak voltages $V_p$, which may differ from one another and the "i" counts or numbers these values.

The embodiment as shown in FIG. 3 can also switch to a hold-mode, wherein the error detector 110 is disconnected from the integrator 120 and is connected to ground. Hence, the control voltage $V_c$ is provided by the capacitance $C_{INT}$, which was charged by the error detector 110 up to the switch to the hold-mode. Since the integrator 120 is not disconnected from the variable shunt resistor 130 during the switch from the normal operation mode to the hold-mode overshoots in the input voltage $V_i$ are avoided—in contrast to the case for conventional circuits as shown in FIG. 2.

Figure 4:
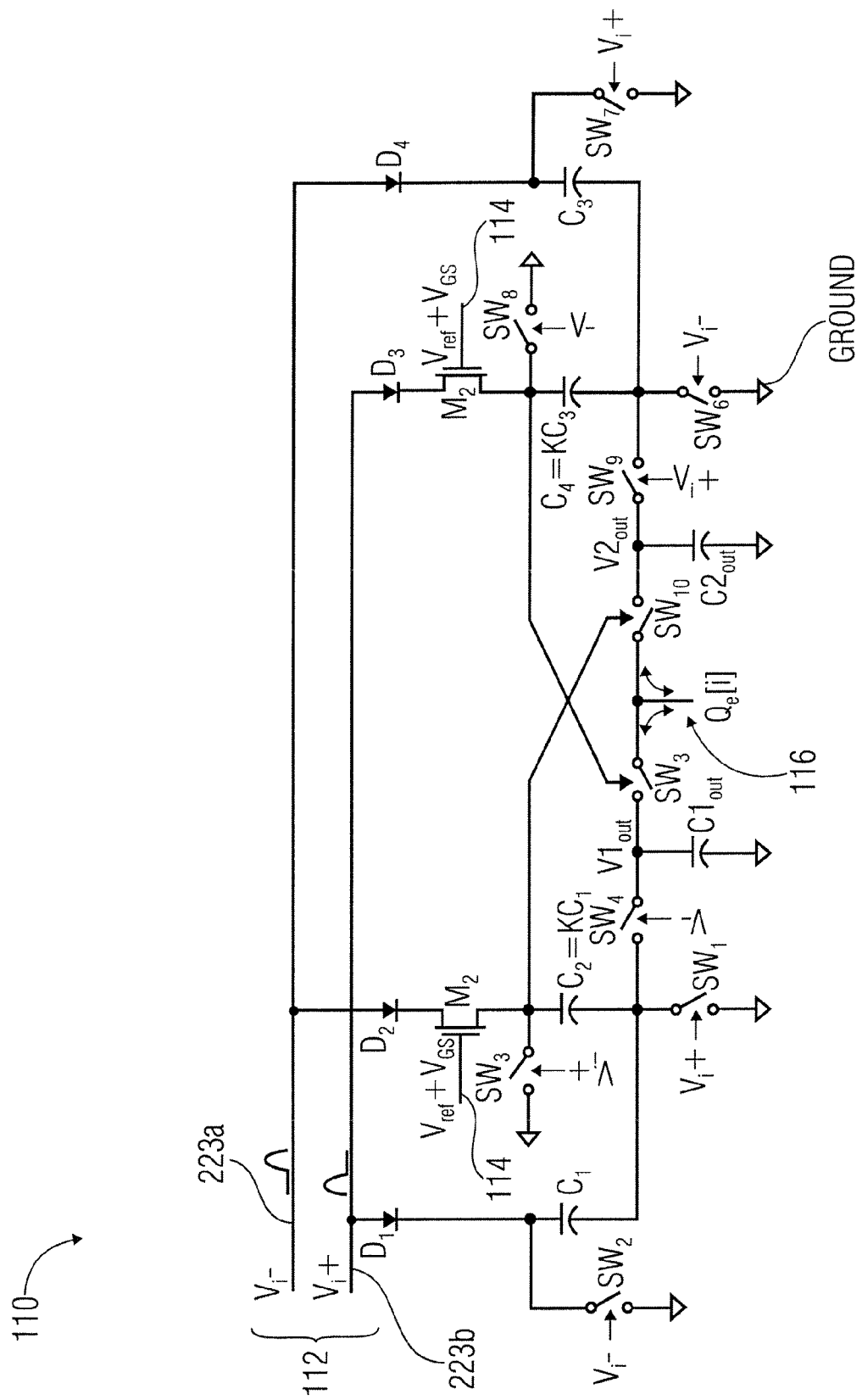
FIG. 4 shows a circuit for an error detector.

FIG. 4 shows an embodiment for the circuit for the error detector 110 comprising an input for the first line 223a and the second line 223b (representing the input 112 of FIG. 1). The circuitry of FIG. 4 comprises the following devices: 10 switches (a first switch SW1, a second switch SW2, ..., a tenth switch SW10), four diodes (a first diode D1, a second diode D2, a third diode D3, and a fourth diode D4), four capacitors (a first capacitor C1, a second capacitor C2, ..., and a fourth capacitor C4) two output capacitors (a first output capacitor $C1_{out}$ and a second output capacitor $C12_{out}$) and two transistors (a first transistor M1 and a second transistor M2).

Each of these devices comprises an input terminal and an output terminal, where the use of input/output may or may not imply a specific signal path. The input/output terminals of the transistors may be the drain or source terminals and the transistors comprise in addition a control terminal (e.g. the gate terminal).

The electrical connection of these devices between the first and second line 223a,b and the output 116 can be described as follows. The second line 223b is connected to the input terminal of the first diode D1 and the output terminal of the first diode D1 is connected to the input terminal of the first capacitor C1 and the output terminal of the first capacitor C1 is connected to the input terminal of the first switch SW1 whose output terminal is connected to ground. The first line 223a is connected to the input terminal of the second diode whose output terminal is connected to the input terminal of the first transistor M1 whose output terminal is connected to the input terminal of the second capacitor C2 whose output terminal is connected to the input terminal of the first switch SW1. The second line 223b is moreover connected to the input terminal of the third diode D3, whose output terminal is connected to the input terminal of the second transistor M2 whose output terminal is connected to the input terminal of the fourth capacitor C4 whose output terminal is connected to the input terminal of the sixths switch SW6 whose output terminal is connected to ground. The first line 223a is moreover connected to the input terminal of the fourth diode D4 whose output terminal is connected to the input terminal of the third capacitor C3 whose output terminal is connected to the input terminal of the sixths switch SW6.

The input terminal of the first capacitor C1 is connected to the input terminal of the second switch SW2 whose output terminal is connected to ground. The input terminal of the third capacitor C3 is connected to the input terminal of the sevenths switch SW7 whose output terminal is connected to ground. The input terminal of the second capacitor C2 is connected to the third switch SW3 whose output terminal is connected to ground. The input terminal of the fourth capacitor C4 is connected the input terminal of the eights switch SW8 whose output terminal is connected to ground.

The output terminal of the second capacitor C2 is connected to the input terminal of the fourth switch SW4 whose output terminal is connected to the first output capacitor C1$_{out}$ whose output terminal is connected to ground. The output terminal of the fourth switch SW4 is connected to the input terminal of the fifths switch SW5 whose output terminal is connected to the output 116 of the error detector 110. The output terminal of the fourth capacitor C4 is connected to the input terminal of the ninths switch SW9 whose output terminal is connected to the input terminal of the second output capacitor C2$_{out}$ whose output terminal is connected to ground. The output terminal of the ninths SW9 is connected to the input terminal of the tens switch SW10 whose output terminal is connected to the output 116 of the error detector 110. A first output node V1$_{out}$ is formed between the output terminal of the fourth switch SW4 and the input terminal of the fifth switch SW5 and a second output node V2$_{out}$ is formed between the output terminal of the ninth switch SW9 and the input terminal of the tenth switch SW10.

The ten switches SW1, SW2, . . . , SW10 are controlled by the following voltages, that means if these voltages are present (signal=true) the switch will close, otherwise they will be open. For example, a peak in the voltage will close the switches and otherwise they will be opened. The input voltage $V_i^+$ at the second line 223b controls the first switch SW1, the third switch SW3, the ninths switch SW9 and the sevenths switch SW7. The input voltage $V_i^-$ at the first line 223a controls the second switch SW2, the fourth switch SW4, the eights switch SW8 and the sixths switch SW6. The voltage present between the output terminal of the first transistor M1 and the input terminal of the second capacitor C2 controls the tenths SW10 and the voltage present between the output terminal of the second transistor M2 and the input terminal of the fourth capacitor C4 controls the fifths switch SW5.

The input 114 for the reference voltage $V_{ref}$ of the error detector 110 is provided by the control terminals of the first and second transistors M1 and M2. Therefore, M1 and M2 control the voltage at which C2 and C4 are charged (discharging occurs through SW1, SW3 and SW6, SW8). Notice that M1 and M2 are driven by $V_{ref}$+VGS, because the source voltage of MOS transistors is VS=VG−VGS (i.e. VS is shifted of VGS with respect of the gate voltage VG). Therefore, M1 and M2 are controlled by a suitable shift of $V_{ref}$: VG=$V_{ref}$+VGS in such a way that VGS is (almost) canceled and VS=($V_{ref}$+VGS)−VGS=$V_{ref}$ (i.e. C2 and C4 are charged at $V_{ref}$).

In further embodiments the circuit as shown in FIG. 4 comprises two symmetric parts implying that the first and third capacitors C1 and C3 comprise an equal capacitance and the second and fourth capacitors C2 and C4 comprise an equal capacitance. The capacitance of the second capacitor C2 can, for example, be a multiple of the first capacitance of the first capacitor C1 (C2=K*C1, K=1,2,3,4, . . . ). In addition, the first and second output capacitors C1$_{out}$ and C2$_{out}$ can also comprise a same capacitance. Similarly, the first and second transistors M1 and M2 can be formed in the same way, so that their resistance is the same for the same reference voltage $V_{ref}$. In this embodiment the error detector 110 as it is shown in FIG. 4 comprises a circuit of two symmetric parts that operate interleaved on the positive/negative semi-periods of the input voltage $V_i$(t) respectively.

Considering the left side, during a positive semi-period, the first capacitor C1 is charged to a peak voltage $V_p^+$ (minus $V_{D1}$), which is the voltage drop on the first diode D1, through the first switch SW1 and the second capacitor C2, is discharged to ground (the third switch SW3 is closed, too). During the negative semi-period, the second switch SW2 and the fourth switch SW4 are closed and the first output node V1$_{out}$ is charged to:

$$V_{out}=1/(K+1)(K\cdot V_{ref}-V_p^+)$$

where K=$C_2/C_1$. Therefore, at the end of the cycle, the charge at the first output capacitor C1$_{out}$ is:

$$Q_e=C_1(K\cdot V_{ref}-V_p^+)$$

when the fifths switch SW5 is closed (for example on the positive semi-period of the next cycle). This charge is transferred in the integrator 120. If the peak voltage $V_p^+$ is equal to K*$V_{ref}$ (plus $V_{D1}$), then the charge is equal zero $Q_e$=0, which corresponds to the steady-state. The potential K*$V_{ref}$ defines, for example, the target voltage. Note that the fifths switch SW5 is driven with the reference potential $V_{ref}$ (instead of the input voltage $V_i^+$) in order to minimize charge injection at the integrator input 122.

Figure 5:
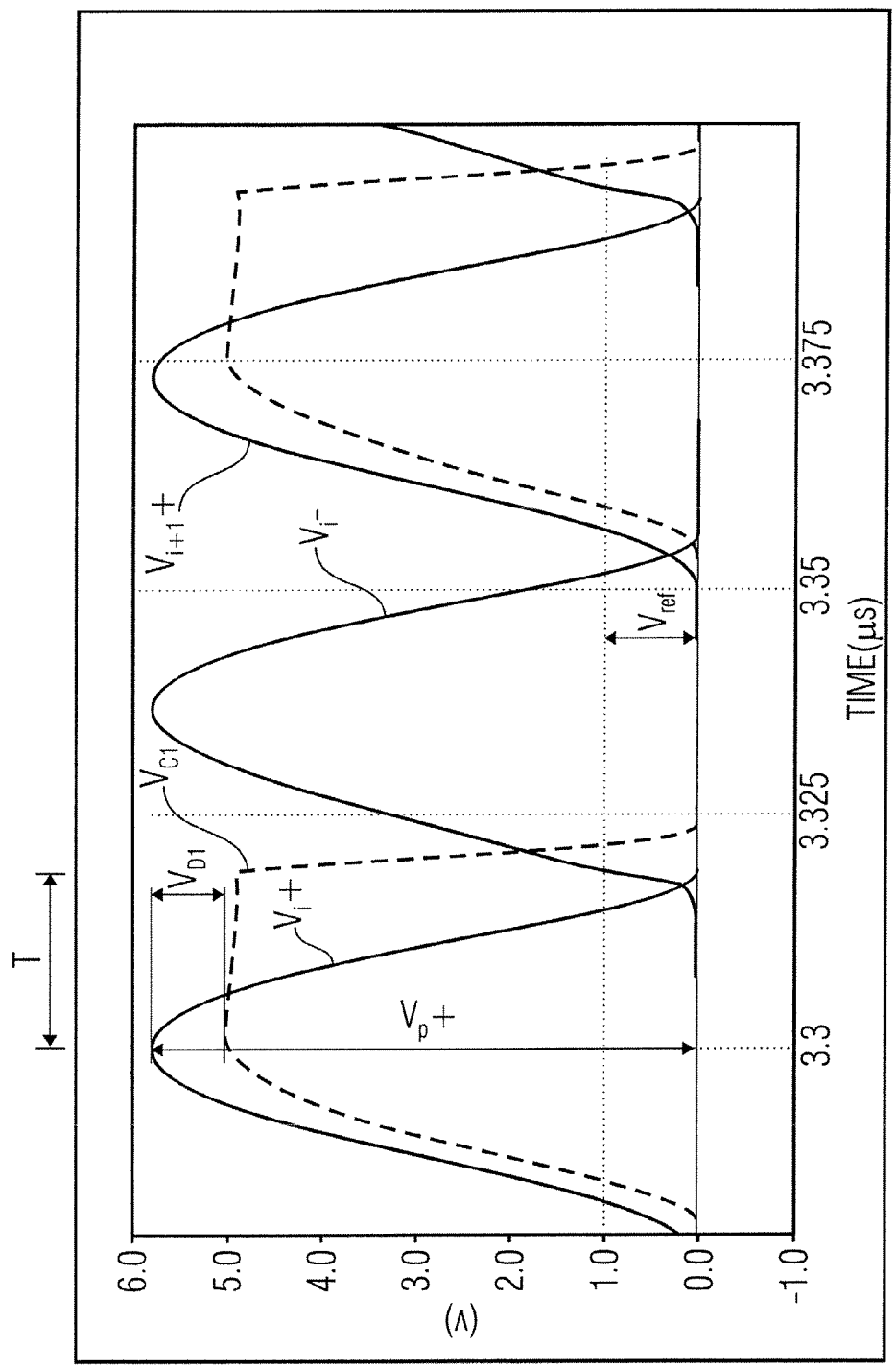
FIG. 5 shows a graph for a regulated input voltage.

FIG. 5 shows a simulation of the error detector 110 for the example that the value K=5, the reference potential $V_{ref}$=1V, and the frequency is equal $f_c=\omega_c/2\pi$=13, 56 MHz. FIG. 5 shows a positive semi-period of the input potential $V_i^+$ which is centered around 3.3 microseconds and a second semi-period $V_{i+1}^+$ is centered around 3.375 microseconds. A negative semi-period of the input voltage $V_i^-$ is formed between the two positive semi-periods of the input potential $V_i^+, V_{i+1}^+$. In this embodiment the peak voltage $V_p^+$ is approximately 5.8V and exceeds the 5 volt limit (5 times the reference potential $V_{ref}$=1V) by the voltage drop over the first diode $V_{D1}$. Therefore, the dashed line indicates the voltage drop $V_{C1}$ over in the first capacitor C1, which remains maximal for a time period T (=time between the peak voltage $V_p^+$ and the beginning of the negative semi-period). When the negative semi-period starts this charge compensates the charge of the second capacitor C2, so that during the negative semi-period no output voltage $V_{out}$ is present at the output terminal $V_{out}$. This 5V limit corresponds, for example, to the target voltage. Therefore, in this simulation no error signal will be output at the output 116 of the error detector 110. In the next (i+1)-th step the graph repeats, i.e. that again the peak voltage $V_p^+$ exceeds the value of $K^*V_{ref}$ by the voltage drop over the first diode D1, so that the output voltage will again be zero when the negative semi-period starts.

Figure 6:
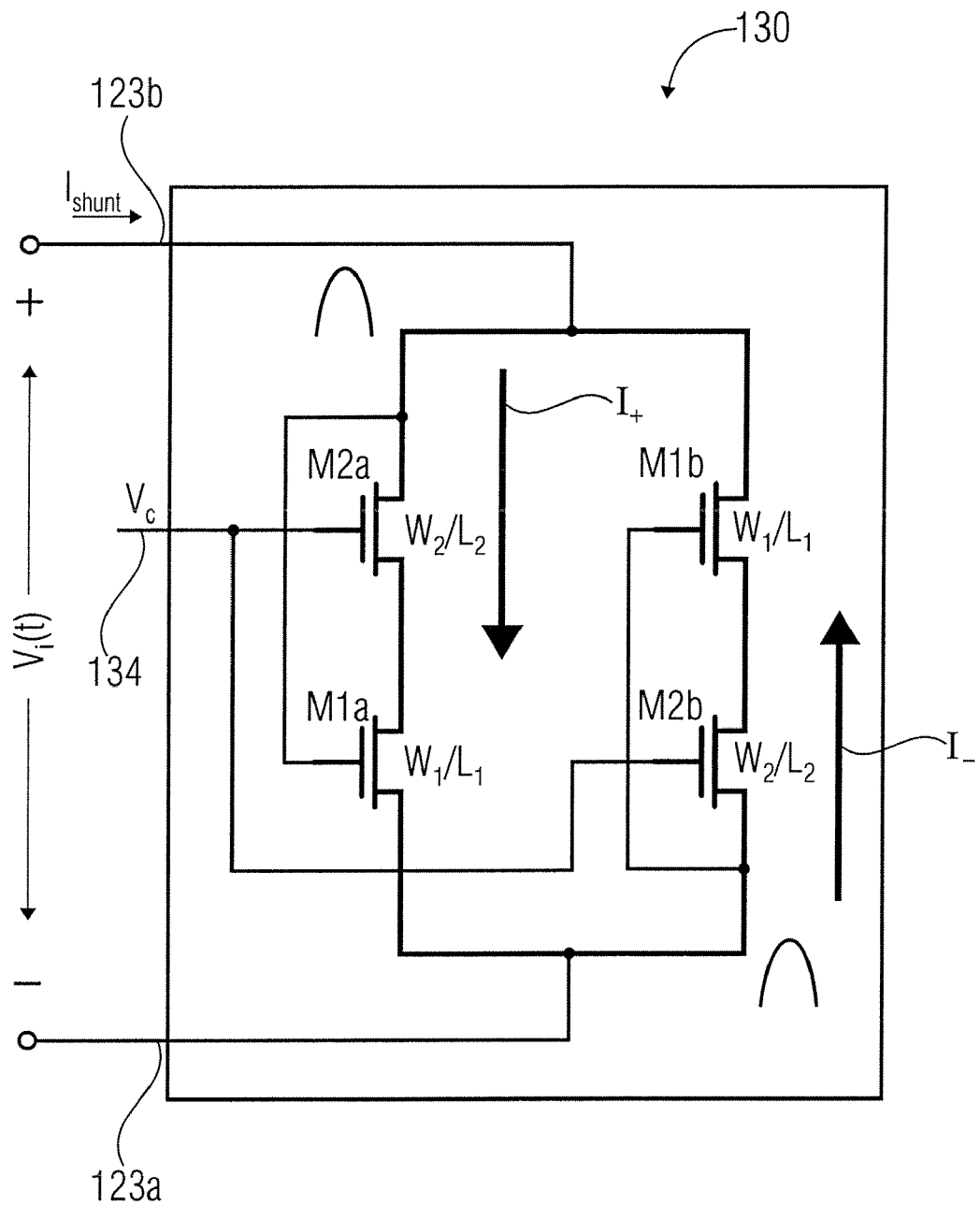

FIG. 6 shows an embodiment for the variable resistor 130 comprises a single-quadrant multiplier, which is connected to the first line 123a and the second line 123b and regulates the shunt current $I_{shunt}$ between the first and second line 123a,b via the terminal 134. The regulation is controlled by the control voltage $V_c$, which is output from the integrator 120 may be applied to the terminal 134 of the variable resistor 130. The variable resistor 130 comprises four transistors (e.g. FETs or MOSFETs), a first transistor M1a, a second transistor M2a, and a third transistor M1b and a fourth transistor M2b, each comprising an input terminal and an output terminal (e.g. source or drain) and a control terminal. These four transistors are connected between the first and second line 123a,b and the terminal 134 of the variable transistor 130 in the following way.

The second line 123b is connected to the input terminal of the second transistor M2a (drain or source) whose output terminal (drain or source) is connected to an input terminal of the first transistor M1a whose output terminal is connected to the first line 123a. The second line 123b is also connected to an input terminal of the third transistor M1b whose output terminal is connected to an input terminal of the fourth transistor M2b whose output terminal is connected to the first line 123a. The control terminal of the first transistor M1a is connected to the input terminal of the second transistor M2a. The control terminal of the second transistor M2a is connected to the terminal 134 of the variable resistor 130. The control terminal of the third transistor M1b is connected to the output terminal of the fourth transistor M2b and the control terminal of the fourth transistor M2b are connected to the terminal 134 of the variable resistor 130.

This connection defines two shunt current paths, one for a first shunt current $I_+$ passing the first and second transistor M1a and M2a and one for a second shunt current $I_-$ passing the third and the fourth transistor M1b, M2b. Each of the four transistors (the first, second, third and fourth transistor) comprise, for example, a field effect transistor, such that a channel can be formed with a width W and a length L, which determine the conductivity of the transistors. The transistors may be formed, such that the ratio of the width to the length W/L of the first and third transistors M1a, M1b are equal to $W_1/L_1$ and the ratio of width to length W/L of the second and fourth transistors M2a, M2b are equal to $W_2/L_2$.

This embodiment of the variable resistor 130 (shunt element) base, therefore, on a single-quadrant multiplier, in which two parallel branches conduct current during the positive/negative semi-period respectively. For instance, during the positive semi-period, assuming that W2/L2>>W1/L1, it holds:

$$V_{DS1a} = V_c - (V_t + V_{ov2a}) \approx V_c - V_t$$

For $(V_c - V_t) < V_i$ the transistors operate in a triode region of the transistors, and it results:

$$I_{shunt} = \beta_{1a}(V_i - V_t)(V_c - V_t) - \beta_{1a}/2(V_c - V_t)^2$$
$$\approx \beta_{1a}(V_i - V_t)(V_c - V_t)$$
$$\approx \beta_{1a} V_i V_c$$

and, therefore, $R_{shunt}(V_c) = 1/(\beta_{1a} V_c)$, wherein $V_t$ comprises a threshold voltage and $V_{ov2a}$ comprises an overdrive voltage of the corresponding transistor.

This example corresponds to the case, where the resistance for the first shunt current $I_+$ from the second line 123b to the first line 123a is mainly determined by the first transistor M1a, which comprises the lowest conductivity (since the ratio between the width and the length is significantly smaller than this ratio for the second transistor M2a). Therefore, the shunt current $I_{shunt}$ can be controlled by the control voltage $V_c$, wherein the parameter β comprises material and geometry dependent quantity determining the conductivity for a given voltage for the first transistor M1a.

Figure 7:
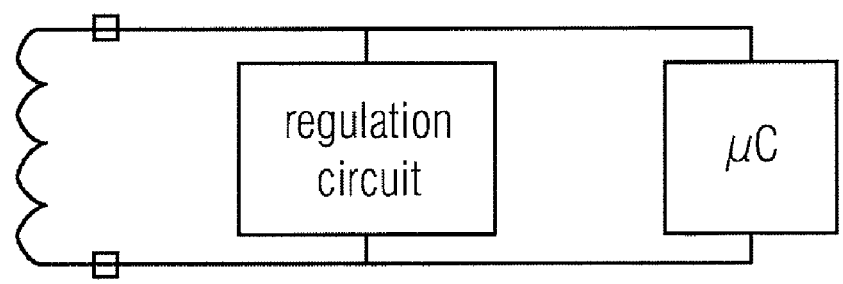
FIG. 7 shows a microcontroller connected with an antenna by a first line and a second line.

FIG. 7 shows a microcontroller connected with an antenna by a first line and a second line.

What is claimed is:

1. A regulation circuit comprising:
   an error detector comprising an input for an input voltage, a further input for a reference voltage and an output for an error signal, wherein the error signal depends on the input voltage and the reference voltage;
   an integrator comprising an input for the error signal and an output for an integrated error signal;
   a voltage regulator comprising an input for the input voltage and a terminal for the integrated error signal, wherein the voltage regulator is configured to adjust a shunt current responsive to the integrated error signal such that the input voltage is adjusted towards a target voltage; and
   a startup module comprising an input for a rectified input voltage, a further input for a trigger signal which signals an end of a startup-mode, an output for a startup signal and a further output for a startup voltage,
   wherein the further output of the startup module is coupled to the output of the integrator.

2. The regulation circuit according to claim 1, wherein the integrator comprises an operational amplifier with a plus input and a minus input, such that the plus input is connected to ground and the minus input is connected to the error detector.

3. The regulation circuit according to claim 2, wherein the integrator further comprises an integrator capacitor between the minus input and the output of the operational amplifier, so that the startup potential charges the capacitor in the startup-mode.

4. The regulation circuit according to claim 2, further comprising:
   a startup switch between the minus input of the operational amplifier and ground; and
   an inverse startup switch between the error detector and the integrator, wherein the startup switch is closed in startup-mode and the inverse switch is opened in startup-mode.

5. The regulation circuit according to claim 2, wherein the operational amplifier comprises an enable contact, which is connected to the startup signal such that the operational amplifier is disabled during startup-mode.

6. The regulation circuit according to claim 1, wherein the input voltage is applicable between a first and a second line, and wherein the voltage regulator further comprises a variable resistor comprising a control terminal connected to the output of the integrator and a voltage applied to the control terminal controls a shunt current between the first and second line.

7. The regulation circuit according to claim 6, wherein the variable resistor comprises a single-quadrant multiplier.

8. The regulation circuit according to claim 6, wherein the variable resistor is configured to provide a shunt current between the first and second line that is proportional to the input voltage.

9. The regulation circuit according to claim 6, further comprising a microcontroller and an antenna, wherein the microcontroller comprises an input for the first and second lines, which are connected to the antenna, and an output for the startup trigger signal such that the microcontroller provides the trigger signal responsive to an input potential.

10. The regulation circuit according to claim 9, wherein the startup module is configured to provide a startup voltage, which is above a threshold to ensure an operation of the microcontroller.

11. A regulation circuit comprising:
an error detector comprising an input for an input voltage, a further input for a reference voltage and an output for an error signal, wherein the error signal depends on the input voltage and the reference voltage;
an integrator comprising an input for the error signal and an output for an integrated error signal; and
a voltage regulator comprising an input for the input voltage and a terminal for the integrated error signal, wherein the voltage regulator is configured to adjust a shunt current responsive to the integrated error signal such that the input voltage is adjusted towards a target voltage; and
wherein the regulation circuit is configured to operate in hold-mode or normal-mode, the regulation circuit further comprising a hold switch and an inverse hold switch,
wherein the hold-switch is connected between the output of the error detector and ground, and wherein the inverse hold-switch is connected between the error detector and the input of the integrator such that in hold-mode the inverse hold switch is opened and the hold switch is closed, and in normal-mode the inverse hold switch is closed and the hold-switch is opened.

12. A regulation circuit comprising:
an error detector comprising an input for an input voltage, a further input for a reference voltage and an output for an error signal, wherein the error signal depends on the input voltage and the reference voltage;
an integrator comprising an input for the error signal and an output for an integrated error signal; and
a voltage regulator comprising an input for the input voltage and a terminal for the integrated error signal, wherein the voltage regulator is configured to adjust a shunt current responsive to the integrated error signal such that the input voltage is adjusted towards a target voltage,
wherein the error detector further comprises capacitors and a rectifier for the input voltage, and a circuitry with two parts operating in an interleaved manner such that charges stored on the capacitors define the error signal.

13. A transponder comprising:
a transponder antenna;
a microcontroller connected with the antenna by a first line and a second line; and
a regulation circuit comprising:
an error detector comprising an input for an input voltage, a further input for a reference voltage and an output for an error signal, wherein the error signal depends on the input voltage and the reference voltage;
an integrator comprising an input for the error signal and an output for an integrated error signal;
a voltage regulator comprising an input for the input voltage and a terminal for the integrated error signal, wherein the voltage regulator is configured to adjust a shunt current responsive to the integrated error signal such that the input voltage is adjusted towards a target voltage; and
a startup module comprising an input for a rectified input voltage, a further input for a trigger signal which signals an end of a startup-mode, an output for a startup signal and a further output for a startup voltage,
wherein the further output of the startup module is coupled to the output of the integrator.

14. An apparatus for regulating an input voltage, comprising:
a means for determining an error signal from an input voltage and a reference voltage;
a means for integrating the error signal and outputting an integrated error signal at an integrating output;
a means for adjusting a shunt current responsive to the integrated error signal at the integrating output such that the input voltage is adjusted towards a target voltage; and
a means for outputting a startup voltage at a start-up output coupled to the integrating output
wherein the apparatus is operative in a startup-mode and a normal-mode, the apparatus further comprising a means for providing the startup voltage and a startup signal, and
wherein in startup mode the startup voltage is applied to a terminal of the means for, adjusting and the means for integrating is disabled.

15. The apparatus of claim 14, further comprising a microcontroller, wherein the target voltage is fixed dependent on an operating range of the microcontroller.

16. A method for regulating an input voltage comprising:
determining an error signal from an input voltage and from a reference voltage;
integrating the error signal and outputting an integrated error signal at an integrating output;
adjusting a shunt current responsive to the integrated error signal at the integrating output such that the input voltage is adjusted towards a target voltage; and
outputting a startup voltage at start-up output coupled to the integrating output,
the method running a startup-mode and a normal-mode, the method further comprising providing the startup voltage and a startup signal,
wherein in startup mode the startup voltage is used in adjusting the shunt current and the integration is disabled.

17. The method of claim 16, further comprising:
fixing the target voltage depending on an operating range of a microcontroller.

* * * * *